(12) United States Patent
Danilov et al.

(10) Patent No.: US 10,936,239 B2
(45) Date of Patent: Mar. 2, 2021

(54) CLUSTER CONTRACTION OF A MAPPED REDUNDANT ARRAY OF INDEPENDENT NODES

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 111 days.

(21) Appl. No.: 16/261,547

(22) Filed: Jan. 29, 2019

(65) Prior Publication Data
US 2020/0241759 A1 Jul. 30, 2020

(51) Int. Cl.
*G06F 3/06* (2006.01)
*G06F 11/20* (2006.01)

(52) U.S. Cl.
CPC ............ *G06F 3/065* (2013.01); *G06F 3/0619* (2013.01); *G06F 3/0631* (2013.01); *G06F 3/0689* (2013.01); *G06F 11/2069* (2013.01); *G06F 2201/82* (2013.01)

(58) Field of Classification Search
CPC ...... G06F 3/065; G06F 9/3891; G06F 9/5077; G06F 11/2069; G06F 3/0631; G06F 3/0644; G06F 3/0689; G06F 3/067
See application file for complete search history.

(56) References Cited

U.S. PATENT DOCUMENTS

| 5,675,802 | A | 10/1997 | Allen et al. |
| 5,805,788 | A | 9/1998 | Johnson |
| 5,950,225 | A | 9/1999 | Kleiman |
| 6,502,243 | B1 | 12/2002 | Thomas |
| 7,389,393 | B1 | 6/2008 | Karr et al. |
| 7,577,091 | B2 | 8/2009 | Antal et al. |
| 7,631,051 | B1 | 12/2009 | Fein et al. |
| 7,664,839 | B1 | 2/2010 | Karr et al. |
| 7,680,875 | B1 | 3/2010 | Shopiro et al. |

(Continued)

OTHER PUBLICATIONS

Non-Final Office Action received for U.S. Appl. No. 16/209,185 dated Jun. 18, 2020, 22 pages.

(Continued)

*Primary Examiner* — Ernest Unelus
(74) *Attorney, Agent, or Firm* — Amin, Turocy & Watson, LLP

(57) ABSTRACT

Contracting a mapped redundant array of independent nodes is disclosed. In a contracted topology for a mapped storage system can be determined based on an initial topology of the mapped storage system. The contracted topology can comprise fewer mapped nodes than the initial topology. Further, the contracted topology can satisfy a rule related to data protection against a failure of a real node of a storage system corresponding to the mapped storage system. In some embodiments, the contracted topology can satisfy another rule related to data protection via distribution of data protection fragments according to the second topology. Data protection via distribution of data protection fragments can result from shifting data protection fragments prior to contraction, shifting mapped nodes based on a count of data protection fragments, etc.

20 Claims, 10 Drawing Sheets

(56) References Cited

U.S. PATENT DOCUMENTS

| | | |
|---|---|---|
| 7,721,044 B1 | 5/2010 | Chatterjee et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,751,599 B2 | 6/2014 | Tran et al. |
| 8,751,740 B1 | 6/2014 | De Forest et al. |
| 8,799,746 B2 | 8/2014 | Baker et al. |
| 8,832,234 B1 | 9/2014 | Brooker et al. |
| 8,856,619 B1 | 10/2014 | Cypher |
| 8,972,478 B1 | 3/2015 | Storer et al. |
| 9,003,086 B1 | 4/2015 | Schuller et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1 | 10/2016 | Bent et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 | 6/2018 | Chatterjee et al. |
| 10,055,145 B1 | 8/2018 | Danilov et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,496,330 B1 | 12/2019 | Bernat et al. |
| 10,503,611 B1 | 12/2019 | Srivastav et al. |
| 10,579,490 B2 | 3/2020 | Danilov et al. |
| 10,613,780 B1 | 4/2020 | Naeni et al. |
| 10,733,053 B1 | 8/2020 | Miller et al. |
| 10,797,863 B2 | 10/2020 | Chen et al. |
| 2002/0166026 A1 | 11/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1* | 4/2009 | Krishnappa ............ G06F 15/16 709/223 |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0328295 A1 | 11/2016 | Baptist et al. |
| 2016/0357649 A1 | 12/2016 | Karrotu et al. |
| 2016/0371145 A1 | 12/2016 | Akutsu et al. |
| 2016/0378242 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |

(56) References Cited

U.S. PATENT DOCUMENTS

| | | |
|---|---|---|
| 2017/0212680 A1 | 7/2017 | Waghulde |
| 2017/0212845 A1 | 7/2017 | Conway |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0114223 A1 | 4/2019 | Pydipaty et al. |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0026810 A1* | 1/2020 | Subramaniam ....... G06F 1/3206 |
| 2020/0050510 A1 | 2/2020 | Chien et al. |
| 2020/0104377 A1 | 4/2020 | Earnesty, Jr. et al. |
| 2020/0117556 A1 | 4/2020 | Zou et al. |

OTHER PUBLICATIONS

Martin Hosken, Developing a Hyper-Converged Storage Strategy for VMware vCloud Director with VMware vSAN, Jan. 2018 (Year: 2018).

Non-Final Office Action received for U.S. Appl. No. 16/261,549 dated Apr. 15, 2020, 22 pages.

Non-Final Office Action received for U.S. Appl. No. 16/374,726 dated Jun. 2, 2020, 47 pages.

Natarajan, RAID 0, RAID 1, RAID 5, RAID 10 Explained with Diagrams, Aug. 10, 2010, thegeekstuff.com (18 pages).

Final Office Action received for U.S. Appl. No. 16/010,255 dated Jul. 23, 2020, 36 pages.

Office Action received for U.S. Appl. No. 16/010,246 dated Jul. 27, 2020 36 pages.

Office Action received for U.S. Appl. No. 16/177,278, dated Aug. 21, 2020, 53 pages.

Office Action received for U.S. Appl. No. 16/179,486, dated Aug. 13, 2020, 64 pages.

Guo et al., "GeoScale: Providing Geo-Elasticity in Distributed Clouds" 2016 IEEE International Conference on Cloud Engineering, 4 pages.

Guo et al., "Providing Geo-Elasticity in Geographically Distributed Clouds". ACM Transactions on Internet Technology, vol. 18, No. 3, Article 38. Apr. 2018. 27 pages.

Non-Final Office Action received for U.S. Appl. No. 16/177,285 dated Jul. 22, 2020, 31 pages.

Office Action received for U.S. Appl. No. 16/254,073, dated Aug. 18, 2020, 62 pages.

Non-Final Office Action received for U.S. Appl. No. 16/261,548 dated Aug. 21, 2020, 42 pages.

Notice of Allowance received for U.S. Appl. No. 16/261,549 dated Jul. 17, 2020, 40 pages.

Qiang et al., "Dynamics Process of Long-running Allocation/ Collection in Linear Storage Space", International Conference on Networking, Architecture, and Storage (NAS 2007), Guilin, 2007, pp. 209-216.

Non-Final Office Action received for U.S. Appl. No. 16/374,725 dated Aug. 19, 2020, 50 pages.

Non-Final Office Action received for U.S. Appl. No. 16/511,161 dated Jul. 10, 2020, 24 pages.

Notice of Allowance received for U.S. Appl. No. 15/862,547 dated Mar. 29, 2019 27 pages.

Non-Final Office Action received for U.S. Appl. No. 15/792,714 dated Apr. 4, 2019, 20 pages.

Final Office Action received for U.S. Appl. No. 15/792,714 dated Sep. 12, 2019, 43 pages.

Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.

Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.

Wikipedia "Front and back ends" URL: https://en.wikipedia.org/wiki/Front_and_back_ends (Year:2019), Sep. 6, 2019, 4 pages.

Notice of Allowance received for U.S. Appl. No. 15/792,714 dated Nov. 8, 2019, 31 pages.

Non-Final Office Action received for U.S. Appl. No. 15/791,390 dated Sep. 20, 2019, 27 pages.

Final Office Action received for U.S. Appl. No. 15/791,390 dated Feb. 6, 2020, 29 pages.

Non-Final Office Action received for U.S. Appl. No. 15/791,390 dated Apr. 30, 2020, 48 pages.

Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.

Non-Final Office Action received for U.S. Appl. No. 16/457,615 dated Jul. 20, 2020, 34 pages.

Non-Final Office Action received for U.S. Appl. No. 15/651,504 dated Mar. 21, 2019, 10 pages.

Non-Final Office Action received for U.S. Appl. No. 15/662,273 dated Nov. 16, 2018, 19 pages.

Final Office Action received for U.S. Appl. No. 15/662,273 dated May 15, 2019, 33 pages.

Non-Final Office Action received for U.S. Appl. No. 15/965,479 dated Apr. 15, 2019, 21 pages.

Non-Final Office Action received for U.S. Appl. No. 15/794,950 dated Jul. 9, 2019, 29 pages.

Final Office Action received for U.S. Appl. No. 15/651,504 dated Sep. 18, 2019, 15 pages.

Non-Final Office Action received for U.S. Appl. No. 15/952,179 dated Sep. 10, 2019, 42 pages.

Wikipedia, "Standard Raid Levels—RAID 6", URL: https://en.wikipedia.org/wiki/Standard_RAID_levels#RAID_6, Oct. 18, 2019, 11 pages.

Non-Final Office Action received for U.S. Appl. No. 15/656,382 dated Nov. 1, 2019, 47 pages.

Final Office Action received for U.S. Appl. No. 15/952,179 dated Nov. 26, 2019, 53 pages.

Non Final Office Action received for U.S. Appl. No. 16/024,314 dated Nov. 25, 2019, 42 pages.

Non- Final Office Action received for U.S. Appl. No. 16/177,278 dated Dec. 2, 2019, 55 pages.

Non-Final Office Action received for U.S. Appl. No. 15/651,504 dated Dec. 31, 2019, 18 pages.

Non-Final Office Action received for U.S. Appl. No. 16/010,246 dated Dec. 5, 2019, 67 pages.

Stonebreaker et al. "Distributed RAID—A New Multiple Copy Algorithm.", IEEE ICDE, 1990, pp. 430-437.

Muralidhar et al. "f4: Facebook's Warm BLOB Storage System", USENIX. OSDI, Oct. 2014, pp. 383-398.

(56) References Cited

OTHER PUBLICATIONS

Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Non-Final Office Action received for U.S. Appl. No. 16/526,142 dated Oct. 15, 2020, 21 pages.
Notice of Allowance received U.S. Appl. No. 16/228,612 date Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (Fast '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.

\* cited by examiner

CLUSTER CONTRACTION OF A MAPPED REDUNDANT ARRAY OF INDEPENDENT NODES

TECHNICAL FIELD

The disclosed subject matter relates to data storage, more particularly, to contracting resources supporting mapped data storage of data stored in storage pools comprising storage devices of at least one array of storage devices.

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. The example ECS system can comprise data storage devices, e.g., disks, etc., arranged in nodes, wherein nodes can comprise an ECS cluster, e.g., an N×M ECS cluster comprising N nodes each having M disks. One use of data storage is in bulk data storage. Data can conventionally be stored in a group of nodes format for a given cluster, for example, in a conventional ECS system, all disks of nodes comprising the group of nodes, e.g., ECS cluster, etc., are considered part of the group. As such, a group with nodes having many disks can, in some conventional embodiments, comprise a large amount of storage, much of which can go underutilized. As an example, a storage group of five nodes, with ten disks per node, at 8 terabytes (TBs) per disk is roughly 400 TB in size. This can be excessively large for some types of data storage. Additionally, apportioning smaller groups, e.g., groups having fewer nodes, groups having nodes with fewer disks, groups having nodes with smaller disks, etc., can be inefficient in regards to processor, network, storage resources, etc., e.g., computer resource usage, to support these smaller groups. As such, it can be desirable to provide logical storage groups at a more granular level to employ portions of larger real groups, thereby promoting more efficient computer resource usage, e.g., retaining a large real group(s) but providing a smaller logical group(s) that can be more appropriate for storing smaller amounts of data that otherwise can be inefficient to store in the large real group(s).

DETAILED DESCRIPTION

Figure 1:
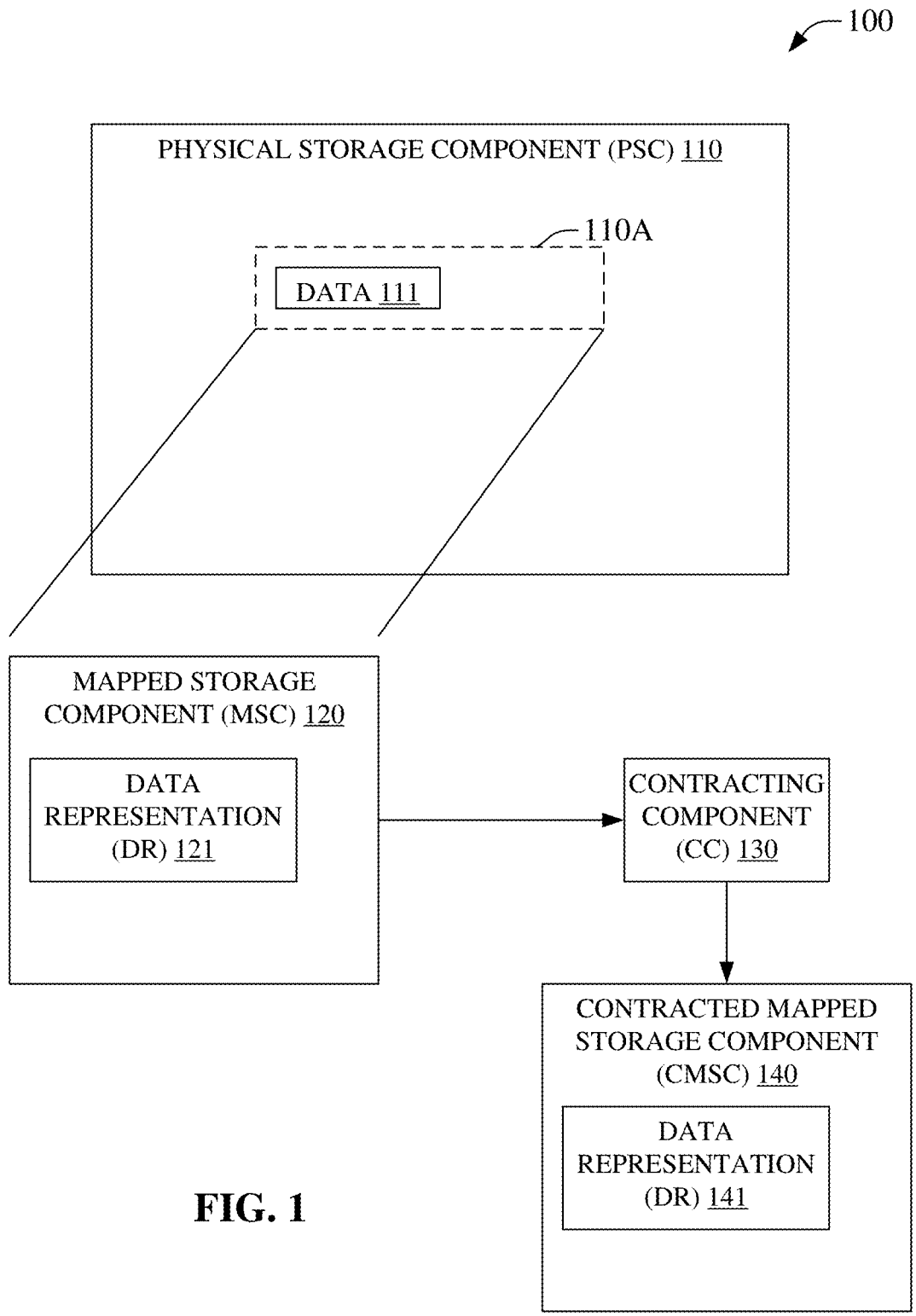
FIG. 1 is an illustration of an example system that can facilitate storage of data in a contracted mapped redundant array of independent nodes, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Data storage techniques can conventionally store data in one or more arrays of data storage devices. As an example, data can be stored in an ECS system such as is provided by DELL EMC. The example ECS system can comprise data storage devices, e.g., disks, etc., arranged in nodes, wherein nodes can be comprised in a redundant array of independent nodes (RAIN), also known as an ECS cluster, referred to herein as a 'real RAIN,' 'real cluster,' 'cluster,' etc. One use of data storage is in bulk data storage. Data can conventionally be stored in a real cluster, for example, in a conventional ECS system, a real cluster comprises all disks of nodes comprised in the real cluster. As such, a real cluster having a node(s) with many disks can, in some conventional embodiments, present a very large amount of storage, which, for some storage applications, can be underutilized. As such, it can be desirable to provide smaller amounts of storage while still being able to deploy large real clusters. This can be accomplished via logically apportioning portions of a real cluster into smaller clusters, e.g., a 'mapped redundant array of independent nodes,' hereinafter referred to as a 'mapped RAIN,' 'mapped cluster,' etc.

In an aspect, one or more mapped clusters can be built upon a real cluster(s), e.g., a mapped cluster can logically comprise all disks of all nodes of a real cluster(s) resulting a mapped cluster that is the same size as the real cluster(s), a first mapped cluster can use some nodes of a real cluster(s) and a second mapped cluster can use other nodes of the real cluster(s), a first mapped cluster can use some disks of the nodes of the real cluster and a second mapped cluster can use other disks of the nodes of the real cluster, first mapped cluster can use some disks of some nodes of the real cluster and a second mapped cluster can use other disks of other nodes of the real cluster, etc. It is to be noted that the disks and nodes of the real cluster allocated to any mapped cluster need not be contiguous in the real cluster. It is to be noted that not all data storage space of the real cluster needs to be apportioned into mapped clusters, and rather, mapped clusters can employ some, none, or all of the data storage space of one or more real clusters. The mapped RAIN technology can provide smaller logical groups that can be used efficiently for storing smaller amounts of data in contrast to storing the same data in a real redundant array of independent nodes. As such, a mapped cluster can provide finer granularity of the data storage system. As an example, where the real cluster is 8×8, e.g., 8 nodes by 8 disks, then, for example, four mapped 4×4 clusters can be provided, wherein each of the four mapped 4×4 clusters is approximately ¼th the size of the real cluster. As a second example, given an 8×8 real cluster, 16 mapped 2×2 clusters can be provided where each mapped cluster is approximately ¹⁄₁₆th the size of the real cluster. As a third example, for the 8×8 real cluster, 2 mapped 4×8 or 8×4 clusters can be provided and each can be approximately ½ the size of the real cluster. Additionally, the example 8×8 real cluster can provide a mix of different sized mapped clusters, for example one 8×4 mapped cluster, one 4×4 mapped cluster, and four 2×2 mapped clusters. In some embodiments, not all of the real cluster must be comprised in a mapped cluster, e.g., an example 8×8 real cluster can comprise only one 2×4 mapped cluster with the rest of the real cluster not (yet) being allocated into mapped storage space.

A mapped RAIN can, in some embodiments, comprise a processor, a virtual processor executing on a real processor, a combination of real processors and virtual processors, etc., that can enable interaction with data "stored in a mapped cluster." The data stored in a mapped cluster can actually be stored on a portion of a disk of a node of a real cluster, but can be interacted with according to a logical relation to a representation said to be 'stored in the mapped cluster." As such, writing data into an address of the mapped cluster can result in writing of the data into an address of the real cluster and association between the mapped cluster address and the real cluster address can be retained to allow other operations with the data. In an aspect, the retention of the real-to-mapped address relationship can be via nearly any technique, for example, via a mapping table, via a data structure, etc., and all such techniques are within the scope of the present disclosure. Additionally, the address relationship is typically updatable, allowing, for example, movement of data at the real cluster to still relate to an unchanged mapped address, allowing movement of the mapped data to still relate to unmoved data at the real address, etc. As an example, where a node of a real cluster fails, the relationship to the mapped address can be updated to associate a redundant duplicate of the data of the real cluster to be associated with the mapped address, thereby allowing a user of the mapped cluster to operate on the data without disturbance. As another example, moving data in a mapped cluster environment can be decoupled from actually moving the data within the real cluster, e.g., the updated mapped address can be affiliated with the unchanged real address, etc. As a further example, a failure of a mapped node, which is not related to a failure of a real node, can be compensated for by providing access to the real data at the unhanged real cluster address via a redundant mapped cluster node. Numerous other examples of mapped RAIN technology are readily appreciable and are considered within the scope of the present disclosure even where not recited for clarity and brevity.

In an aspect, a topology of a mapped RAIN can be altered. As an example, a mapped RAIN having eight nodes of four disks each can be altered, for example, to a mapped RAIN having four nodes of eight disks each (contraction), to a mapped RAIN having 16 nodes of two disks each (expansion), etc. In an embodiment, contraction of a mapped RAID can be regarded as a reduction in a node count without reducing the count of disks managed by the mapped RAID. Contraction of the mapped cluster can be beneficial by allowing, for example, for more efficient use of computing resources, e.g., more efficient processor use, reduced network use, faster data access on storage devise, more efficient use of data storage device space, etc. Generally, where there is a reduction in the amount of work to be performed by a mapped RAID, e.g., a change in client procedures that results in less interaction with data stored in a mapped cluster, etc., contracting the mapped cluster can provide an opportunity to tailor the mapped cluster to the new amount of work, e.g., fewer data access events can be accommodated by fewer mapped RAIN processors, so it can be beneficial to adapt the mapped cluster topology to have fewer nodes of more disks to preserve existing data. As an example, an eight node by four disk mapped cluster can use more processors less efficiently to interact with the same data as can be in a contracted mapped cluster having four nodes by eight disks. In contrast to conventional systems that can physically migrate the data between nodes, the mapped cluster can logically compact the mapped cluster without needing to physically migrate the stored data. Best practices can be applied, e.g., as rules, procedures, etc., to compaction of a mapped cluster, e.g., to preserve data protection mechanisms, etc.

In an embodiment, contraction of a mapped cluster can logically reallocate disks of nodes to be removed into nodes to be preserved after the contraction. It can be desirable, e.g., a best practice, to prevent disks of a single real cluster node from being allocated to more than one node of a mapped cluster. This can be desirable, for example, to avoid a data loss event, such as where a loss of the real cluster node results in data of multiple mapped nodes becoming inaccessible, more especially because the mapped cluster can manage data redundancy for the mapped cluster across the nodes of that mapped cluster such that inaccessibility of data on multiple mapped nodes can result in failure to access redundant representations of the data. As such, a rule prohibiting the use of disks of one real node of a real cluster from being employed in more than one mapped node of a single mapped cluster can be applied to determining viable contraction topologies. It will be noted that disks form a single real node can be correlated to mapped nodes of different mapped clusters without violating this rule.

In another aspect, it can be desirable to preserve a mapped cluster data protection scheme. In an embodiment, the storage of data via a mapped cluster can be performed in accord with a data protection scheme, e.g., erasure coding, etc. In an aspect, erasure coding, for example a 12+4 erasure coding resulting in 12 data fragments and four coding fragments, can result in these fragments being comprised in the stored data, as an example, ECS can employ a 12+4 erasure encoding to allow for loss of up to four fragments without loss of data. The fragments, e.g., the protection set, can be apportioned in a mapped cluster to prevent loss of more fragments, e.g., via loss of a mapped node, mapped disk of a mapped node, etc., than is allowable to maintain data protection via the erasure encoding. However, contraction can result in some nodes having sufficient fragments to risk data loss if the mapped node becomes inaccessible.

Accordingly, contraction of the mapped cluster can reflect rules, techniques, etc., to preserve a data protection scheme. As an example, for 12+4 erasure coding, a topology can be determined that does not allow any mapped node after contraction to comprise more than four fragments. In an embodiment of this example, code fragments can be moved prior to contraction, nodes can be contracted selectively to prevent aggregate fragment counts from exceeding a threshold, etc.

Other aspects of the disclosed subject matter provide additional features generally not associated with real cluster data storage. In some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a further example, a mapped cluster can comprise storage space from a first real cluster having hardware nodes in a first data center in Seattle, Wash., and a second data center having hardware nodes in Tacoma, Wash. As another example, a mapped cluster can comprise storage space from a first real cluster having hardware nodes in a first data center in Houston, Tex., and a second real cluster having hardware nodes in a data center in Mosco, Russia.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate storage of data in a contracted mapped redundant array of independent nodes, in accordance with aspects of the subject disclosure. System 100 can comprise physical storage component (PSC) 110. PSC 110 can comprise a real cluster, portion of a real cluster, portions of more than one real cluster, multiple clusters, etc. PSC 110 can facilitate data operations, e.g., storing data, accessing data, deleting data, moving data, copying data, duplicating data, etc. In some embodiments, PSC 110 can be part of a geographically diverse storage system. In some embodiments, PSC 110 can support data convolving storage systems, for example storing an XOR chunk that is a representation of a data from a first chunk and a second chunk in a convolved form, etc.

In an aspect, data 111 can be stored at portion 110A of PSC 110. Data 111 can be stored in a data storage element of PSC 110. As an example, an addressable memory cell can comprise information representative of data 111. This example addressable memory cell, for example, can be comprised in a hard drive, disk, solid state storage device, optical storage medium, etc. In an aspect, portion 110A of PSC 110 can comprise the data storage element, a component comprising the data storage element, a portion of a component comprising the data storage element, portions or all of multiple components wherein they comprise the data storage element, etc. As an example, portion 110A of PSC 110 can comprise a disk than comprises the data storage element that stores information representing data 111. Data 111 can be interacted with, operated on, etc., via a communicative coupling to PSC 110, to a component comprised in portion 110A, etc. As an example, PSC 110 can be a real cluster comprising real nodes that each comprise real disks, wherein portion 110A is comprised in a portion of the real disks, wherein the real disks comprise data storage elements, and wherein a data storage element of the data storage elements can store information representing data 111, whereby the information representing data 111 can be written into the storage element via a communicative coupling between PSC 110 and another device such that the information representing data 111 is associated with an address (or other identifier) of the data storage element enabling operations/interactions with the information representing data 111. It will be noted that the term 'data 111' can be synonymous with the term 'information representing data 111' in that, for example, binary information representing the data is conventionally regarded as data 111, for example, a photo can be data 111 and the information representing the photo can also be regarded as data 111, etc., and this convention is employed in the instant disclosure for clarity and brevity, although where needed distinctions between the information representing data and the data itself can be indicated where noteworthy. Additionally, as is noted herein, PSC 110 can be a large data storage space, e.g., a real cluster of many nodes each having many large disks, etc., which can result in inefficient use of the storage space for many types of storage than can be more efficiently supported by a smaller data storage space. Accordingly, mapped RAIN technology, as disclosed, can provide more granular use of PSC 110.

Mapped storage component (MSC) 120 of system 100 can logically represent a portion of PSC 110, e.g., portion 110A, etc., as a mapped cluster. A mapped cluster can therefore comprise a data representation (DR) of data stored in a portion of PSC 110, e.g., DR 121 can be a representation of data 111 of portion 110A of PSC 110, etc. MSC 120 can enable interactions with DR 121 that can propagate to data 111. In some embodiments, MSC 120 can comprise mapped nodes having mapped disks, which can logically represent portion 110A. A processor of MSC 120 can receive an instruction to perform an operation on DR 121, such as overwriting DR 121, etc., that can be translated by the processor and communicated to PSC 110 to cause data 111 to be overwritten. In an aspect, DR 121 can be correlated to data 111, e.g., in a mapping table, etc., to enable an operation directed to an address (or other identifier) of DR 121 to be translated into an operation directed to data 111 based on the correlation of DR 121 and data 111. As is noted herein, mapped RAIN can provide abstraction of one or more portions of a real cluster to enable data operations that can different levels of efficiency, speed, reliability, etc., than can be achieved by directly employing a real cluster for data operations.

System 100 can further comprise contracting component (CC) 130. CC 130 can enable contraction of MSC 120, resulting in contracted MSC (CMSC) 140. As is noted herein, an embodiment of the disclosed subject matter contracts a mapped cluster by reducing the count of nodes while maintaining the overall count of disks. As an example, a 16 node by 32 disk MSC, having a total of 512 disks, can be contracted into an eight node by 64 disk CMSC, into a four node by 128 disk CMSC, etc., each having fewer nodes but maintaining the total of 512 disks. CMSC 140 can comprise DR 141 that can correspond to data 111 of portion 110A of PSC 110 in a manner similar to the correlation of DR 121 with data 111.

Contracting MSC 120 into CMSC 140 via CC 130 can result in fewer nodes comprising representations correlating to data stored in portion 110A of PSC 110. In an embodiment, fewer nodes can result in consuming fewer computing resources. As an example, where each node can be associated with use of a real processor, virtual processor, etc., even where data is not being operated upon, each node can consume an overhead level of computing resources and, accordingly, fewer processors can therefore consume fewer overhead levels of computing resources. As a further example, where a data operation in an MSC can move data from one mapped node to another mapped node, e.g., between mapped disks of different mapped nodes, this data operation can consume network resources to communicate between computing resources supporting the different mapped nodes of the MSC, however, after contraction, the data, in some instance, can be moved between mapped disks within the same mapped node, thereby consuming fewer network resources. Numerous other examples of changes to computer resource consumption resulting from contraction of an MSC into a CMSC will be appreciated and all such examples are within the scope of the instant disclosure even where not explicitly recited for the sake of clarity and brevity.

After contraction by CC 130, CMSC 140 can facilitate data operations within CMSC 140, e.g., interaction/operation with DR 141, etc. As an example, new data can be written (not illustrated) into CMSC 140, which can result in creation of a new DR which can be correlated to writing a new data into portion 110A of PSC 110, wherein the new DR and the new data are correlated to facilitate operations/interactions with the new data via the new DR. As another example, operations/interactions with DR 141 can be propagated to data 111 based on a correlation between DR 141 and data 111 reflective of the correlation between DR 121 and data 111, e.g., DR 141 can be based on DR 121 and therefore can inherit the correlation to data 111, etc.

Figure 2:
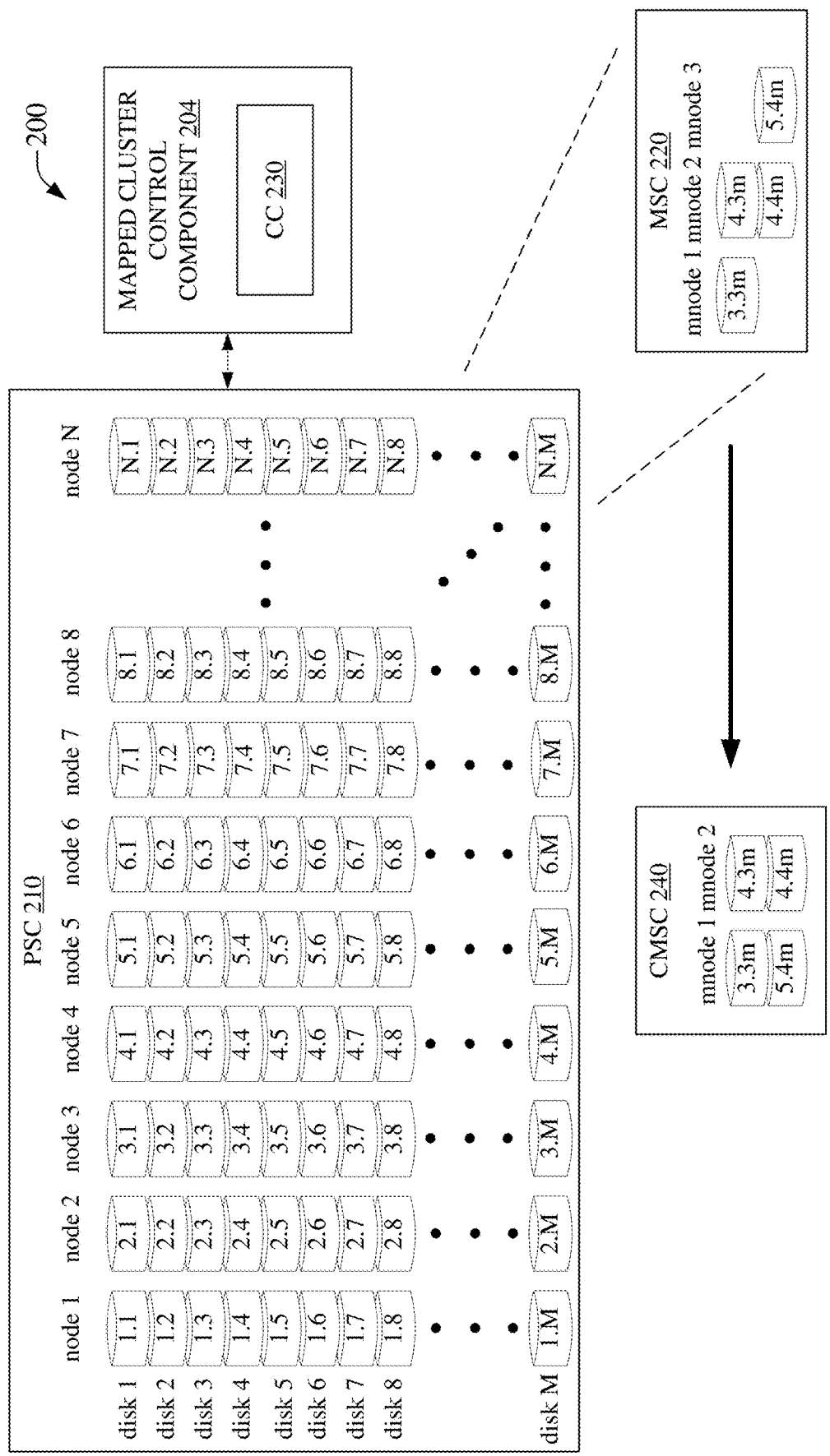
FIG. 2 is an illustration of an example system that can facilitate storage of data via a contracted mapped cluster having fewer mapped nodes than an uncontracted mapped cluster, in accordance with aspects of the subject disclosure.

FIG. 2 is an illustration of a system 200, which can enable storage of data via a contracted mapped cluster having fewer mapped nodes than an uncontracted mapped cluster, in accordance with aspects of the subject disclosure. System 200 can comprise PSC 210. PSC 210 can comprise a real cluster, portion of a real cluster, portions of more than one real cluster, multiple clusters, etc. PSC 210 can facilitate data operations, e.g., storing data, accessing data, deleting data, moving data, copying data, duplicating data, etc. In some embodiments, PSC 210 can be part of a geographically diverse storage system. In some embodiments, PSC 210 can support data convolving storage systems, for example storing an XOR chunk that is a representation of a data from a first chunk and a second chunk in a convolved form, etc.

In an aspect, data can be stored at a portion of PSC 210, e.g., via a data storage element of PSC. As an example, an addressable memory cell can comprise data. This example addressable memory cell can be comprised in a hard drive, disk, solid state storage device, optical storage medium, etc., for example disks 1.1 through N.M, etc. In an aspect, a portion of PSC 210 can comprise the data storage element, a component comprising the data storage element, a portion of a component comprising the data storage element, portions or all of multiple components wherein they comprise the data storage element, etc. As an example, the portion of PSC 210 can comprise a disk, e.g., one or more of disks 1.1 through N.M, etc., that comprises the data storage element that stores the data. The data can be interacted with, operated on, etc., via a communicative coupling to PSC 210, to a component comprised in a portion of PSC 210, etc. As an example, PSC 210 can be a real cluster comprising real nodes, e.g., node 1 through node N, etc., that each comprise real disks, e.g., disk 1 through disk M, correspondingly, etc. wherein a portion of PSC 210 is comprised in a subset of the set of disks 1.1 through N.M, etc., wherein the disks 1.1 through N.M, etc., comprise data storage elements, and wherein a data storage element of the data storage elements can store data, whereby the data can be written into the storage element via a communicative coupling between PSC 210 and another device, such that the data is associated with an address (or other identifier) of the data storage element enabling operations/interactions with the data. As is noted herein, PSC 210 can be a large data storage space, e.g., a real cluster of many nodes, e.g., N nodes, each having many large disks, e.g., M disks in each of the N nodes, etc., which can result in inefficient use of the storage space for many types of storage that can be more efficiently supported by a smaller data storage space. Accordingly, mapped RAIN technology, as disclosed, can provide more granular use of PSC 210.

System 200 can comprise MSC 220, which can logically represent a portion of PSC 210 as a mapped cluster. A mapped cluster can therefore comprise a DR of data stored in a portion of PSC 210, wherein the DR can correspond to data of the portion of PSC 210, etc. MSC 220 can enable interactions with the DR that can be propagated to the data. In some embodiments, MSC 220 can comprise mapped nodes, e.g., mnode 1 through mnode 3, etc., having mapped disks, e.g., 3.3 m through 5.4 m, etc., which can logically represent a portion of PSC 210, e.g., mapped disk 3.3 m of MSC 220 can correspond to disk 3.3 of PSC 210. In an embodiment, a processor of MSC 220 can receive an instruction to perform an operation on a DR that can be translated by the processor and communicated to PSC 210 to cause an operation with corresponding data of PSC 210. In an aspect, a DR can be correlated to data of PSC 210 to enable an operation directed to an address (or other identifier) of the DR to be translated into an operation directed to an address of corresponding data in PSC 210 based on the correlation of DR and the data of PSC 210, e.g., reading, writing, overwriting, updating, deleting, moving, copying, duplicating, etc., directed at a DR can be performed on corresponding data of PSC 210. As is noted herein, mapped RAIN can provide abstraction of one or more portions of a real cluster to enable data operations that can different levels of efficiency, speed, reliability, etc., than can be achieved by directly employing a real cluster for data operations.

System 200 can further comprise CC 230. In an embodiment, CC 230 can be comprised in mapped cluster control component 204 and can enable contraction of MSC 220, resulting in CMSC 240. It is noted that CC 230 can be comprised in other components, e.g., CC 230 can be comprised in PSC 210, in MSC 230, as a discrete component (not illustrated), as part of another not-illustrated component, etc. CC 230, in an embodiment, can contract a mapped cluster by reducing the count of nodes while maintaining the overall count of disks. As an example, the three mnodes of MSC 230, e.g., mnode 1 through mnode 3, having a total of four disks, e.g., 3.3 m-4.3 m-4.4 m-5.4 m, can be contracted into a two node CMSC, e.g., mnode 1 through mnode 2, having four disks, e.g., 3.3 m-4.3 m-4.4 m-5.4 m, thereby maintaining the four disks but on two nodes instead of three nodes. CMSC 240 can comprise DRs in the four disks, e.g., 3.3 m-4.3 m-4.4 m-5.4 m, that can correspond to data of a portion of PSC 210, e.g., data on 3.3-4.3-4.4-5.4 of PSC 210, in a manner similar to the correlation of DRs of MSC disks four disks 3.3 m-4.3 m-4.4 m-5.4 m, to data on 3.3-4.3-4.4-5.4 of PSC 210.

Contracting MSC 220 into CMSC 240 via CC 230 is illustrated as resulting in fewer nodes comprising representations correlating to data stored in portions of PSC 210. In an embodiment, fewer nodes can result in consuming fewer computing resources. After contraction by CC 230, CMSC 240 can facilitate data operations within CMSC 240, e.g., interaction/operation with DRs of mapped disks 3.3 m-4.3 m-4.4 m-5.4 m, can result in operations with data of real disks 3.3-4.3-4.4-5.4 of PSC 210. As an example, data can be deleted (not illustrated) from a mapped disk of CMSC 240, which can result in deletion of correlated data from a corresponding real disk of a portion of PSC 210. It is noted that the mapped disks of MSC 220, CMSC 240, etc., can be data representing data on the real disks of PSC 210, e.g., the mapped disks do not have to be real physical disks. In this regard, the mapped disks can be abstractions of data stored on a real disk of PSC 210, e.g., a DR of a mapped disk can be a reference to corresponding data of a real disk of PSC 210, wherein the information relating to the example DR can be stored in a non-transitory manner, e.g., written to disk, to an electronic programmable read only memory (EPROM), written to an optical media, written to a solid state memory device, etc., such that it can be 'operated on' in a manner that is propagated to the corresponding data stored on PSC 210. In an embodiment, MSC 220, CMSC 240, etc., can be virtual machines, e.g., running virtual processor instance(s) for an mnode(s) and operating on DR(s) that can themselves be virtualized data, however, the use of mapped RAIN technology can result in operations interacting with real data stored on real components, e.g., PSC 210, etc., and generally also results in generating data from the virtual machines that is stored/updated/changed in a non-transitory storage medium. As an example, even in a cloud computing environment executing a virtualized instance of CMSC 240, the DR correlation, operations on DRs, etc., of CMSC 240 can be memorialized in changes to mapping tables, etc., stored on real memory, typically non-volatile memory, such that it can be interacted with and can be retained for more than a transitory time, e.g., preserved in a power outage, software crash, etc., to avoid loss of customer data by losing reference, e.g., losing the DRs referring, to the data stored in real components of PSC 210.

Figure 3:
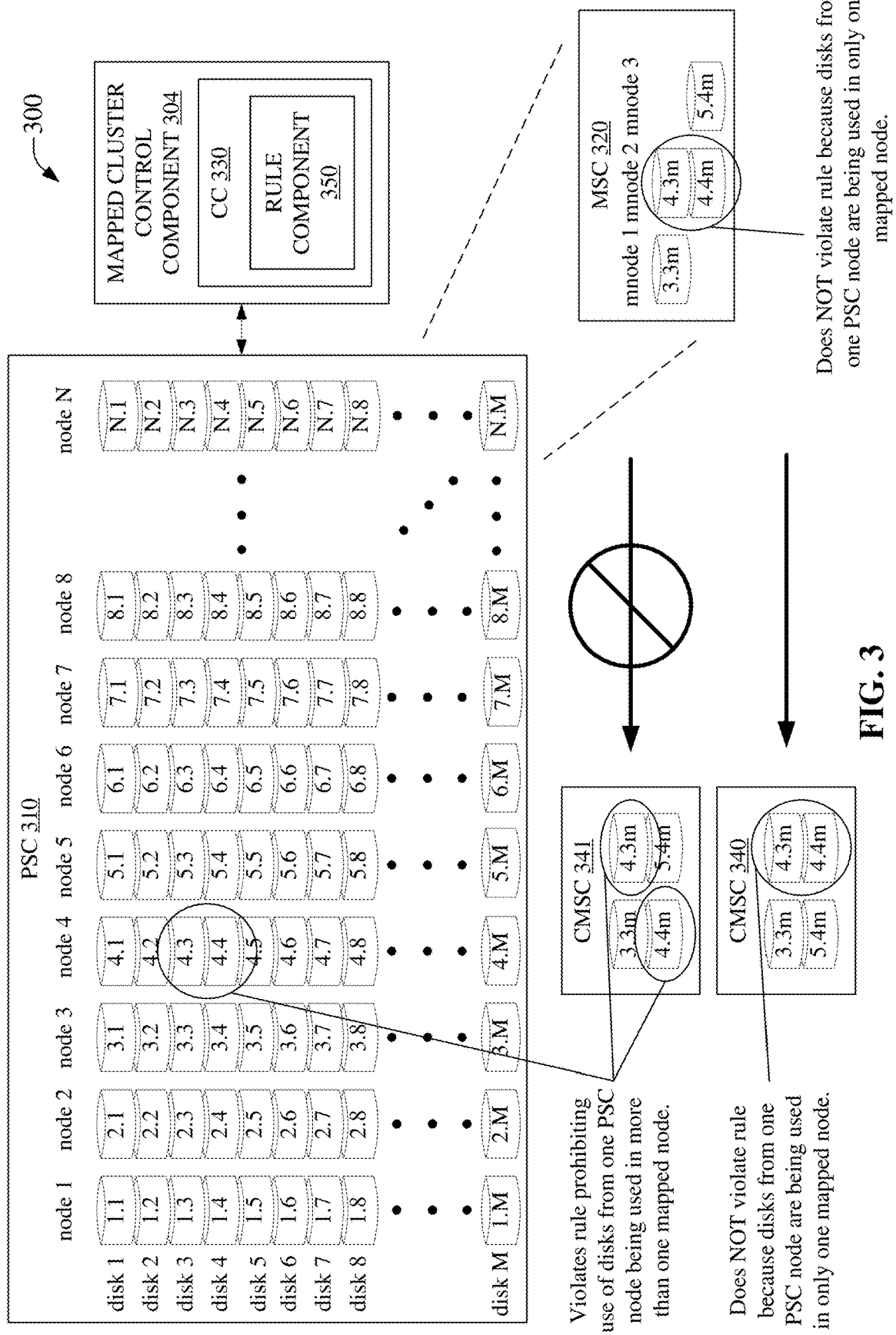
FIG. 3 is an illustration of an example system that can enable storage of data in a contracted mapped cluster in accord with a real node failure data protection rule, in accordance with aspects of the subject disclosure.

FIG. 3 is an illustration of a system 300, which can facilitate storage of data in a contracted mapped cluster in accord with a real node failure data protection rule, in accordance with aspects of the subject disclosure. System 300 can comprise PSC 310, which can comprise a real cluster, portion of a real cluster, portions of more than one real cluster, multiple clusters, etc. PSC 310 can facilitate data operations, e.g., storing data, accessing data, deleting data, moving data, copying data, duplicating data, etc. In some embodiments, PSC 310 can be part of a geographically diverse storage system. In some embodiments, PSC 310 can support data convolving storage systems, for example storing an XOR chunk that is a representation of a data from a first chunk and a second chunk in a convolved form, etc.

In an aspect, data can be stored at a portion of PSC 310, e.g., via a data storage element of PSC 310. As an example, a referenceable memory cell can comprise data. This example referenceable memory cell can be comprised in a hard drive, disk, solid state storage device, optical storage medium, etc., for example disks 1.1 through N.M, etc. In an aspect, a portion of PSC 310 can comprise a data storage element, a component comprising a data storage element, a portion of a component comprising a data storage element, portions or all of multiple components wherein they together comprise a data storage element, etc. As an example, PSC 310 can comprise a disk, e.g., one or more of disks 1.1 through N.M, etc., that can comprise a data storage element that stores data. The data can be interacted with, operated on, etc., via a communicative coupling to PSC 310, to a component comprised in a portion of PSC 310, etc. As an example, PSC 310 can be a real cluster comprising real nodes, e.g., node 1 through node N, etc., that each comprise real disks, e.g., disk 1 through disk M, correspondingly, etc. wherein a portion of PSC 310 is comprised in a subset of the set of disks 1.1 through N.M, etc., wherein the disks 1.1 through N.M comprise data storage elements, and wherein a data storage element of the data storage elements can store data, whereby the data can be stored via the storage element by a communicative coupling between PSC 310 and another device, such that the data is associated with a reference to the data storage element enabling operations/interactions with the data. As is noted herein, PSC 310 can be a large data storage space, e.g., a real cluster of many nodes, e.g., N nodes, each having many disks, e.g., M disks in each of the N nodes, etc., which can result in inefficient use of the storage space for many types of storage that can be more efficiently supported by a smaller data storage space. Accordingly, mapped RAIN technology, as disclosed, can provide more granular use of PSC 310.

System 300 can comprise MSC 320, which can logically represent a portion of PSC 310 as a mapped cluster. A mapped cluster can therefore comprise a DR to data stored in a portion of PSC 310, wherein the DR can correspond to data of the portion of PSC 310, etc. MSC 320 can enable interactions with the DR that can be propagated to the data. In some embodiments, MSC 320 can comprise mapped nodes, e.g., mnode 1 through mnode 3, etc., having mapped disks, e.g., 3.3 m through 5.4 m, etc., which can logically represent a portion of PSC 310, e.g., mapped disk 3.3 m of MSC 320 can correspond to disk 3.3 of PSC 310, etc.

In an embodiment, a processor of MSC 320 can receive an instruction to perform an operation on a DR that can be translated by the processor and communicated to PSC 310 to cause an operation with corresponding data of PSC 310. It is noted that the mapped disks of MSC 320, CMSC 340, etc., can be data representing data on the real disks of PSC 310, e.g., the mapped disks do not have to be real physical disks. In this regard, the mapped disks can be abstractions of data stored on a real disk of PSC 310, e.g., a DR of a mapped disk can be a reference to corresponding data of a real disk of PSC 310, wherein the information relating to the example DR can be stored in a non-transitory manner, e.g., written to disk, to an EPROM, to optical media, to a solid state memory device, etc., such that it can be 'operated on' in a manner that is propagated to the corresponding data stored on PSC 310. In an embodiment, MSC 320, CMSC 340, etc., can be virtual machines, e.g., running virtual processor instance(s) for an mnode(s) and operating on DR(s) that can themselves be virtualized data, however, the use of mapped RAIN technology can result in operations interacting with real data stored on real components, e.g., PSC 310, etc., and generally also results in generating data from the virtual machines that is stored, updated, changed, etc., in a non-transitory storage medium. In an aspect, a DR can be correlated to data of PSC 310 to enable an operation directed to an address (or other identifier) of the DR to be translated into an operation directed to an address of corresponding data in PSC 310 based on the correlation of DR and the data of PSC 310, e.g., reading, writing, overwriting, updating, deleting, moving, copying, duplicating, etc., directed at a DR can be performed on corresponding data of PSC 310, and the DR can be accordingly updated. As an example, an operation to move a DR can result in moving the corresponding data at PSC 310 and updating the DR to reflect the address of the new location of the data at PSC 310, which changes the data of the DR itself and the representation stored on a non-volatile storage medium can be accordingly changed/updated. As is noted herein, mapped RAIN can provide abstraction of one or more portions of a real cluster to enable data operations that can result in different levels of efficiency, speed, reliability, etc., than can be achieved by directly employing a real cluster for data operations.

System 300 can further comprise CC 330. In an embodiment, CC 330 can be comprised in mapped cluster control component 304 and can enable contraction of MSC 320, resulting in CMSC 340. CC 330 can further comprised rile component 350, which can, in some other embodiments also be comprised in other components, e.g., rule component 350 can be comprised in in mapped cluster control component 304, in PSC 310, in MSC 330, as a discrete component (not illustrated), as part of another not-illustrated component, etc. CC 330, in an embodiment, can contract a mapped cluster by reducing the count of nodes while maintaining the overall count of disks. However, this contraction can be subject to satisfaction of a contraction rule. In an aspect, as disclosed herein, it can be risky to have data from one real node be referenced by more than one mapped node of a single mapped cluster because this can result in data loss events. Accordingly, a rule can be generated, applied, etc., e.g., via rule component 350, etc., to prohibit compaction of a mapped cluster that results in more than one mapped node of the resulting CMSC representing data of a single real node of PSC 310. As an example, the three mnodes of MSC 330, having a total of four disks, can be contracted into a two node CMSC having four disks. As will be observed, CMSC 340 can comprise the four disks, e.g., 3.3 m-4.3 m-4.4 m-5.4 m, corresponding to data on real disks 3.3-4.3-4.4-5.4 of PSC 310 without having more than one mapped node of CMSC 340 representing data from disks of one node of PSC 310, and CMSC 340 can determined, by rule component 350, to be in compliance with a rule, for example a rule that prohibits use of disks from one PSC node being used in more than one mapped node. In contrast, compaction of MSC 320 into CMSC 341 can be prohibited where CMSC 341 can be determined by rule component 350 to violate the example rule, e.g., resulting in disks 4.3 and 4.4 of real node 4 being represented in two mapped nodes of CMSC 341, which can result in failure of two mapped nodes of CMSC 341 with the failure of only one real node of PSC 310 thereby threatening and redundant data protection scheme that can be employed by a CMSC to protect data of the CMSC.

Figure 4:
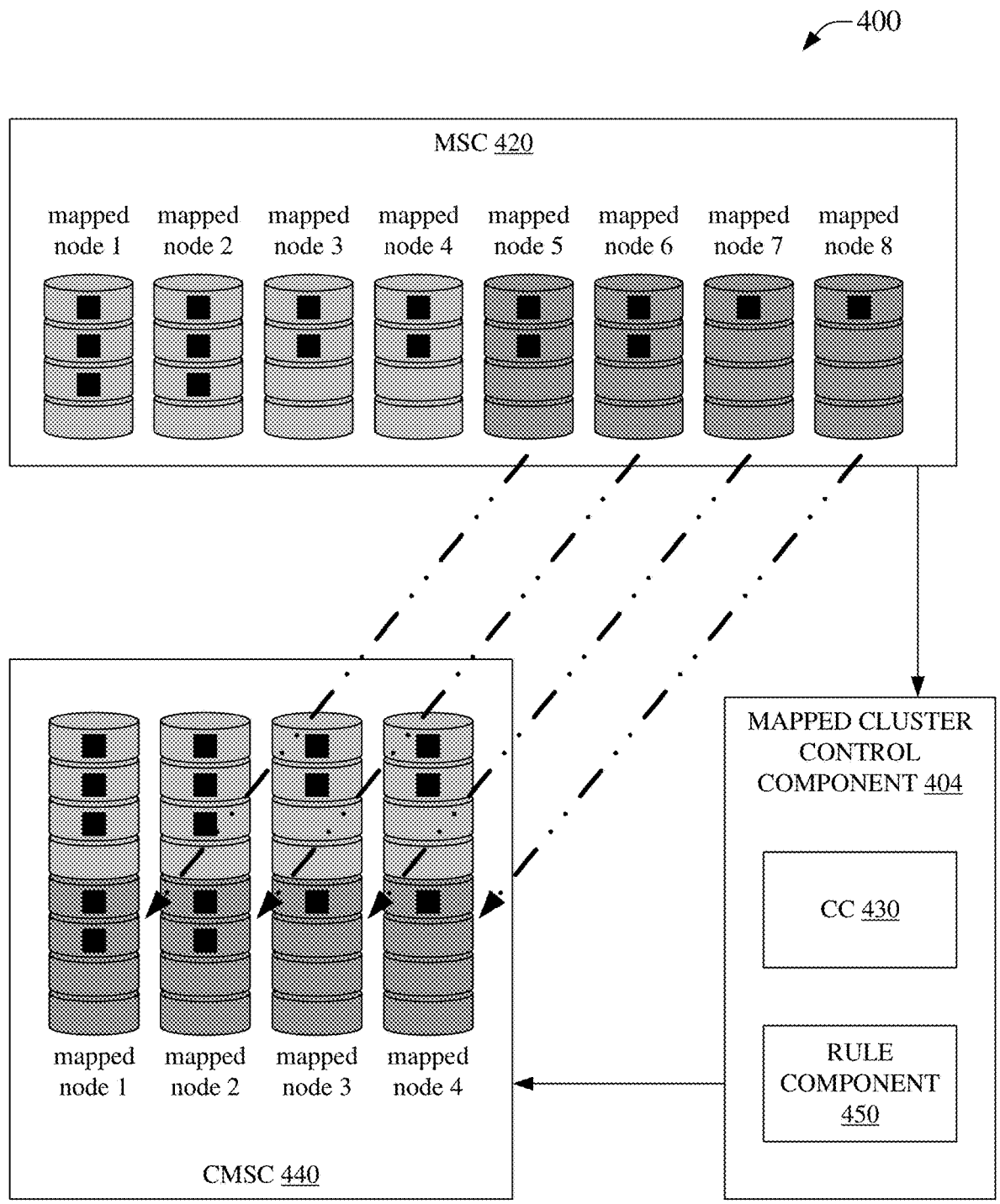
FIG. 4 illustrates an example system that can facilitate storage of data in a contracted mapped cluster without application of a data protection fragment rule, in accordance with aspects of the subject disclosure.

FIG. 4 is an illustration of a system 400, which can enable storage of data in a contracted mapped cluster without application of a data protection fragment rule, in accordance with aspects of the subject disclosure. System 400 can comprise MSC 420 that, for example, can be an 8×4 mapped cluster, e.g., eight mapped nodes each comprising four mapped disks. System 400 illustrates compaction of MSC 420 into CMSC 440, which, for example, can be a 4×8 mapped cluster, e.g., four mapped nodes each comprising eight mapped disks. Compaction can be enabled, caused, initiated, performed by, etc., CC 430, which can be comprised in mapped cluster control component 404. Further, compaction can be performed according to one or more rules via rule component 450. In an embodiment, where the movement of mapped disks of mapped nodes 5 through 8 of MSC 420 into mapped nodes 1 through 4 of CMSC 440 as indicated by the dash-dot-dot arrows is determined, e.g., via rule component 450, to satisfy a rule, e.g., prohibiting one real node from being represented in more than one mapped node, etc., then the compaction can occur as illustrated. It will be noted that storage of data in the real nodes and as abstracted by the mapped node topology can be associated with data protection fragments, illustrated as black squares in the mapped disks of the mapped clusters before and after contraction.

In an aspect, the data protection fragments can be generated as part of a data protection scheme, for example, erasure coding is a well-known way to protect data. Using the example of erasure coding, data can be divided into k data fragments and, during encoding, redundant m coding fragments can be created. The example erasure coding can assures that a system can tolerate the loss of up to m data/coding fragments. The data/coding fragments can be termed a 'protection set' wherein each protection set can comprising k data fragments and m coding fragments relative to the data the protection set protects. Fragments of a protection set can be distributed between mapped cluster nodes/disks and be reflected in data corresponding to the fragments stored on real nodes/disks of a real cluster. The layout of the fragments, e.g., distribution of fragments in a real/mapped cluster, generally is selected to assure a required level of fault tolerance. However, cluster contraction can change the layout of the fragments during contraction and can make some protection sets vulnerable. As is illustrated in system 400, for an example 12+4 protection scheme, e.g., 12 data fragments and four coding fragments, which allow for the loss of up to four fragments without jeopardizing the data, MSC 420 can tolerate the loss of any mapped node without jeopardizing the data. However, contraction of MSC 420 into CMSC 440 can result in redistribution of the fragments that can jeopardize the data, e.g., loss of either mapped node 1 or mapped node 2 of CMSC 430 can result in a 'data loss' event because more than four fragments can be lost, e.g., as a result of cluster contraction, mapped node 1 and mapped node 2 each contain five fragments. It will be noted that failure of a mapped node does result in an actual data loss, e.g., the actual data is stored on a real disk of a real node or a real cluster and, accordingly, failure of a mapped node typically will not affect the storage of the real data, although restarting of a mapped node, a storage service(s) of the mapped node, etc., can take time in which the mapped data is not accessible. As such, a rule can be applied (not illustrated in system 400) that can be related to appropriate distribution of fragments such that loss of a mapped node does not result in loss of sufficient fragments so as to make data inaccessible for a period of time. It will be noted in system 400 that a first rule can be determined, e.g., via rule component 450, to be satisfied, e.g., that compaction does not result in one real node being represented in more than one mapped node of a single mapped cluster, etc., while a second rule is disregarded, e.g., disregarding redistribution of data protection fragments as disclosed herein. Accordingly, CMSC 440 can be prone to inaccessible data where certain mapped nodes fail, but can be protected against some failures of real nodes. There can be different techniques for satisfying fragment-distribution-type rules, as is illustrated herein below.

Figure 5:
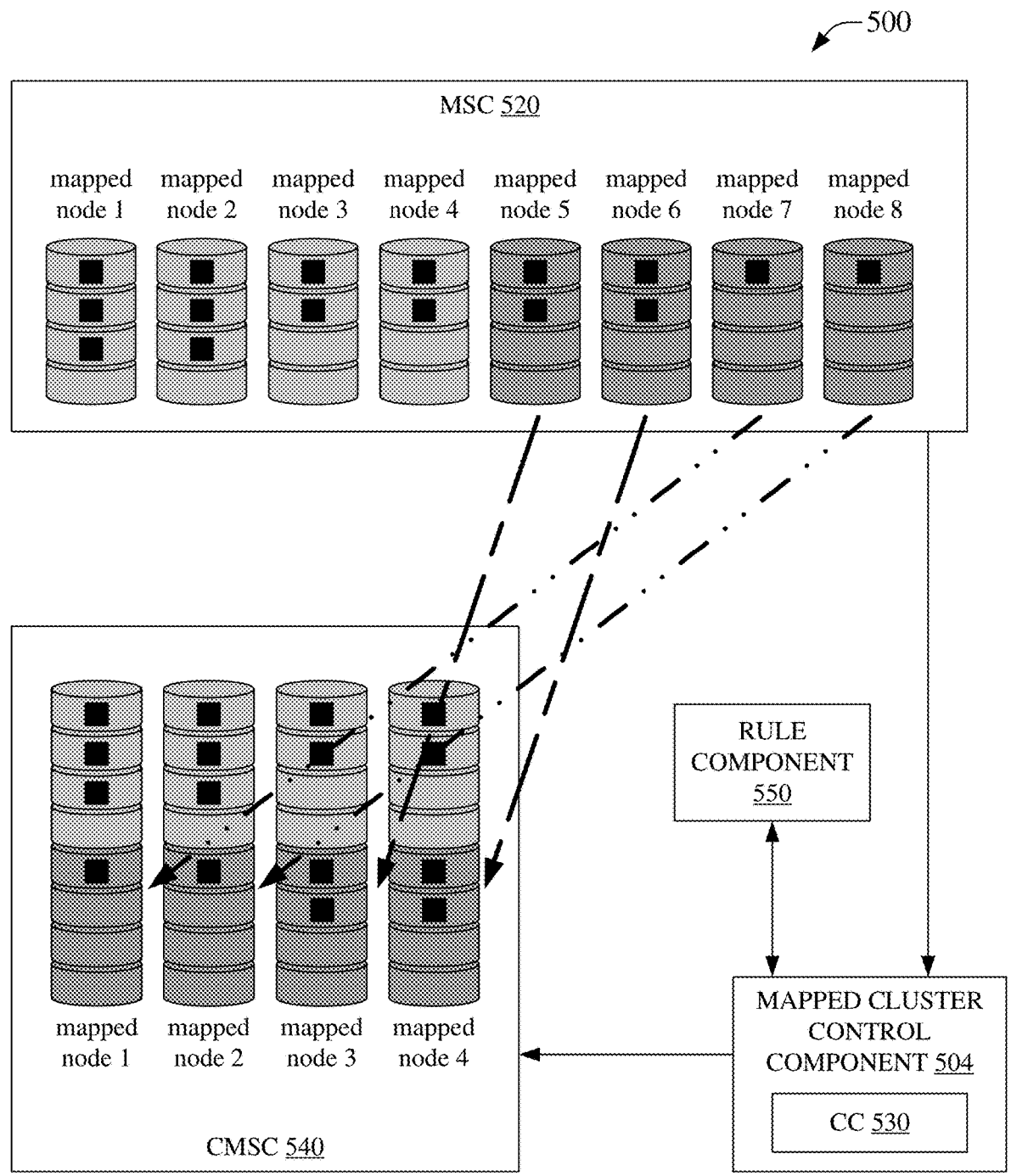
FIG. 5 illustrates an example system that can facilitate storage of data in a contracted mapped cluster via selective shifting according to a data protection fragment rule, in accordance with aspects of the subject disclosure.

FIG. 5 is an illustration of a system 500, which can enable storage of data in a contracted mapped cluster via selective shifting according to a data protection fragment rule, in accordance with aspects of the subject disclosure. System 500 can comprise MSC 520 that, for example, can be an 8×4 mapped cluster, e.g., eight mapped nodes each comprising four mapped disks. System 500 illustrates compaction of MSC 520 into CMSC 540, which, for example, can be a 4×8 mapped cluster, e.g., four mapped nodes each comprising eight mapped disks. Compaction can be enabled, caused, initiated, performed by, etc., CC 530, which can be comprised in mapped cluster control component 504. Further, compaction can be performed according to one or more rules via rule component 550. In an embodiment, where the movement of mapped disks of mapped nodes 5 through 8 of MSC 520 into mapped nodes 1 through 4 of CMSC 540 as indicated by the dash-dot-dot arrows is determined, e.g., via rule component 550, to satisfy a rule, e.g., prohibiting one real node from being represented in more than one mapped node, etc., then the compaction can occur as illustrated. It will be noted that storage of data in the real nodes and as abstracted by the mapped node topology can be associated with data protection fragments, illustrated as black squares in the mapped disks of the mapped clusters before and after contraction.

In an aspect, the data protection fragments can be generated as part of a data protection scheme, for example, erasure coding, etc. Using the example of erasure coding, fragments of a protection set can be distributed between mapped cluster nodes/disks and be reflected in data corresponding to the fragments stored on real nodes/disks of a real cluster. The layout of the fragments, e.g., distribution of fragments in a real/mapped cluster, is generally selected to assure a required level of fault tolerance. However, cluster contraction can change the layout of the fragments during contraction and can make some protection sets vulnerable. As is illustrated in system 500, for an example 12+4 protection scheme, e.g., 12 data fragments and four coding fragments, which allow for the loss of up to four fragments without jeopardizing the data, MSC 520 can tolerate the loss of any mapped node without jeopardizing the data. Additionally, contraction of MSC 520 into CMSC 540 can result in redistribution of the fragments in a manner that comports with the data protection scheme, e.g., loss of any mapped node of CMSC 530 will not result in a 'data loss' event because no more than four fragments can be lost with any one mapped node failure, e.g., as a result of cluster contraction as illustrated, the mapped nodes each have no more than four fragments. The contraction from MSC 520 to CMSC 540 can be selected based on the predicted fragment pattern of CMSC 540 being determined to not violate a rule relating to fragment distribution in a contraction operation, e.g., applying a rule via rule component 550, etc., related to appropriate distribution of fragments such that loss of a mapped node does not result in loss of sufficient fragments so as to make data inaccessible for a period of time. It will be noted in system 500 that both a first rule and second rule can be determined, e.g., via rule component 550, to be satisfied, e.g., wherein the first rule relates to compaction that does not result in one real node being represented in more than one mapped node of a single mapped cluster, etc., and wherein the second rule relates to satisfactory redistribution of data protection fragments as disclosed herein. Accordingly, CMSC 540 can be immune to inaccessible data where a mapped node fails, and can also be protected against failures of real nodes. It will be noted that system 500 moves mapped nodes according to both example rules rather than redistributing fragments themselves. It will be further noted that in some instances the second example rule can be satisfied but the first example rule cannot be satisfied by the illustrated technique of contracting the mapped nodes according to fragment distribution. As such, in some instances it can be desirable to redistribute the fragments prior to contracting the mapped nodes, see, for example, system 600.

Figure 6:
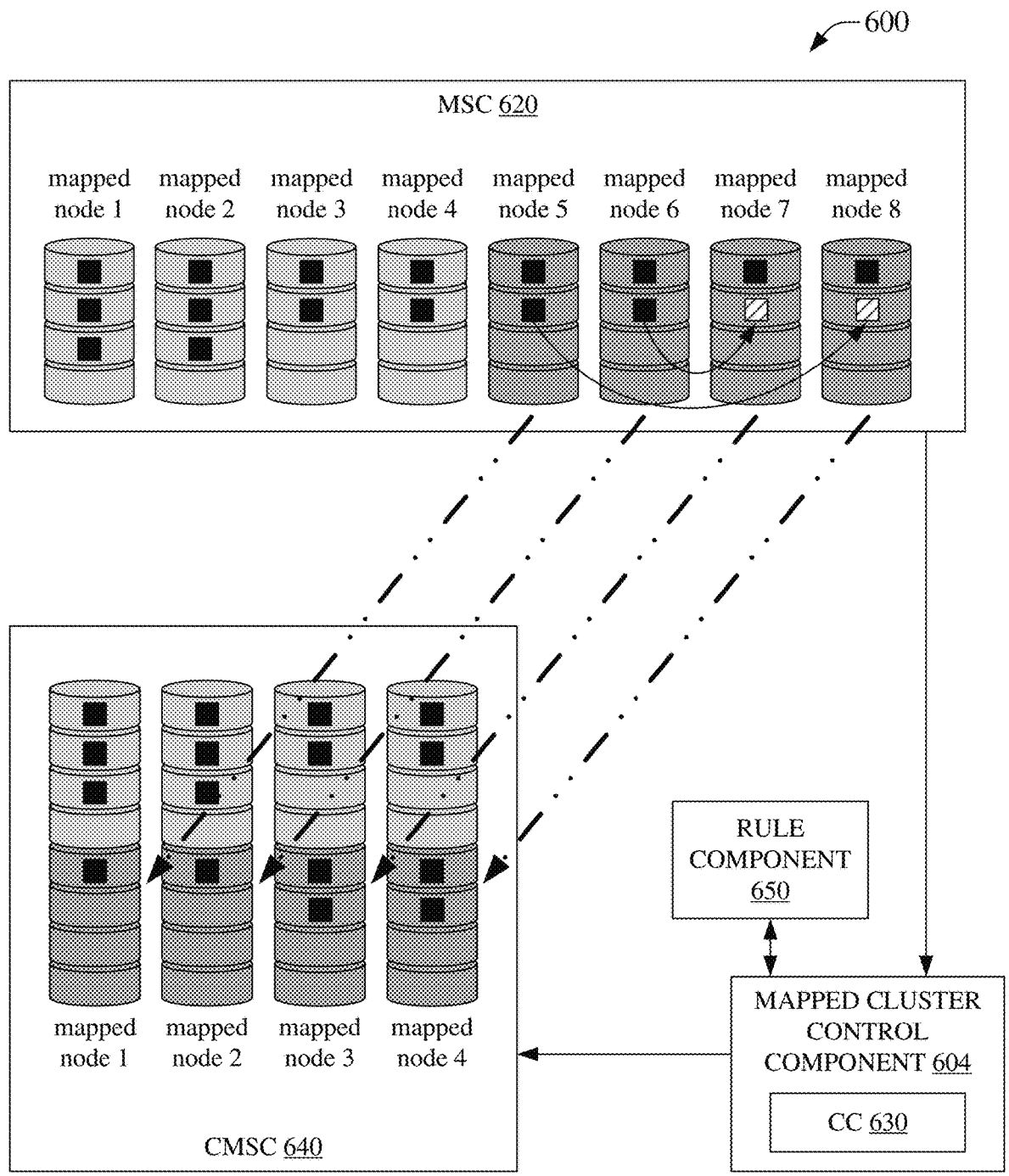
FIG. 6 illustrates an example system that can facilitate storage of data in a contracted mapped cluster via data protection fragment migration according to a data protection fragment rule, in accordance with aspects of the subject disclosure.

FIG. 6 is an illustration of a system 600 that can provide for storage of data in a contracted mapped cluster via data protection fragment migration according to a data protection fragment rule, in accordance with aspects of the subject disclosure. System 600 can comprise MSC 620 that, for example, can be an 8×4 mapped cluster, e.g., eight mapped nodes each comprising four mapped disks. System 600 illustrates compaction of MSC 620 into CMSC 640, which, for example, can be a 4×8 mapped cluster, e.g., four mapped nodes each comprising eight mapped disks. Compaction can be enabled, caused, initiated, performed by, etc., CC 630, which can be comprised in mapped cluster control component 604. Further, compaction can be performed according to one or more rules via rule component 650. In an embodiment, where the movement of mapped disks of mapped nodes 5 through 8 of MSC 620 into mapped nodes 1 through 4 of CMSC 640 as indicated by the dash-dot-dot arrows is determined, e.g., via rule component 650, to satisfy a rule, e.g., prohibiting one real node from being represented in more than one mapped node, etc., then the compaction can occur as illustrated. It will be noted that storage of data in the real nodes and as abstracted by the mapped node topology can be associated with data protection fragments, illustrated as black squares in the mapped disks of the mapped clusters before and after contraction.

In an aspect, the data protection fragments can be generated as part of a data protection scheme, for example, erasure coding, etc. Using the example of erasure coding, fragments of a protection set can be distributed between mapped cluster nodes/disks and be reflected in data corresponding to the fragments stored on real nodes/disks of a real cluster. The layout of the fragments, e.g., distribution of fragments in a real/mapped cluster, is generally selected to assure a required level of fault tolerance. However, cluster contraction can change the layout of the fragments during contraction and can make some protection sets vulnerable. As is illustrated in system 600, for an example 12+4 protection scheme, e.g., 12 data fragments and four coding fragments, which allow for the loss of up to four fragments without jeopardizing the data, MSC 620 can tolerate the loss of any mapped node without jeopardizing the data. Additionally, contraction of MSC 620 into CMSC 640 can result in redistribution of the fragments in a manner that comports with the data protection scheme, e.g., loss of any mapped node of CMSC 630 will not result in a 'data loss' event because no more than four fragments can be lost with any one mapped node failure, e.g., as a result of cluster contraction as illustrated, the mapped nodes each have no more than four fragments. The contraction from MSC 620 to CMSC 640 can be selected based on the predicted fragment pattern of CMSC 640 being determined to not violate a rule relating to fragment distribution in a contraction operation, e.g., applying a rule via rule component 650, etc., related to appropriate distribution of fragments such that loss of a mapped node does not result in loss of sufficient fragments so as to make data inaccessible for a period of time. It will be noted in system 600 that both a first rule and second rule can be determined, e.g., via rule component 650, to be satisfied, e.g., wherein the first rule relates to compaction that does not result in one real node being represented in more than one mapped node of a single mapped cluster, etc., and wherein the second rule relates to satisfactory redistribution of data protection fragments as disclosed herein. Accordingly, CMSC 640 can be immune to inaccessible data where a mapped node fails, and can also be protected against failures of real nodes. It will be noted that system 600 can redistributing fragments prior to contracting the mapped nodes, e.g., as illustrated the fragment of mapped node 5 and mapped node 6 of MSC 620 can be redistributed prior to contraction into mapped node 7 and mapped node 8 of MSC 620. Thereafter, in this example, the contraction of the mapped node 5 into mapped node 1, etc., can proceed without violating the second example rule related to distribution of data protection fragments.

Figure 7:
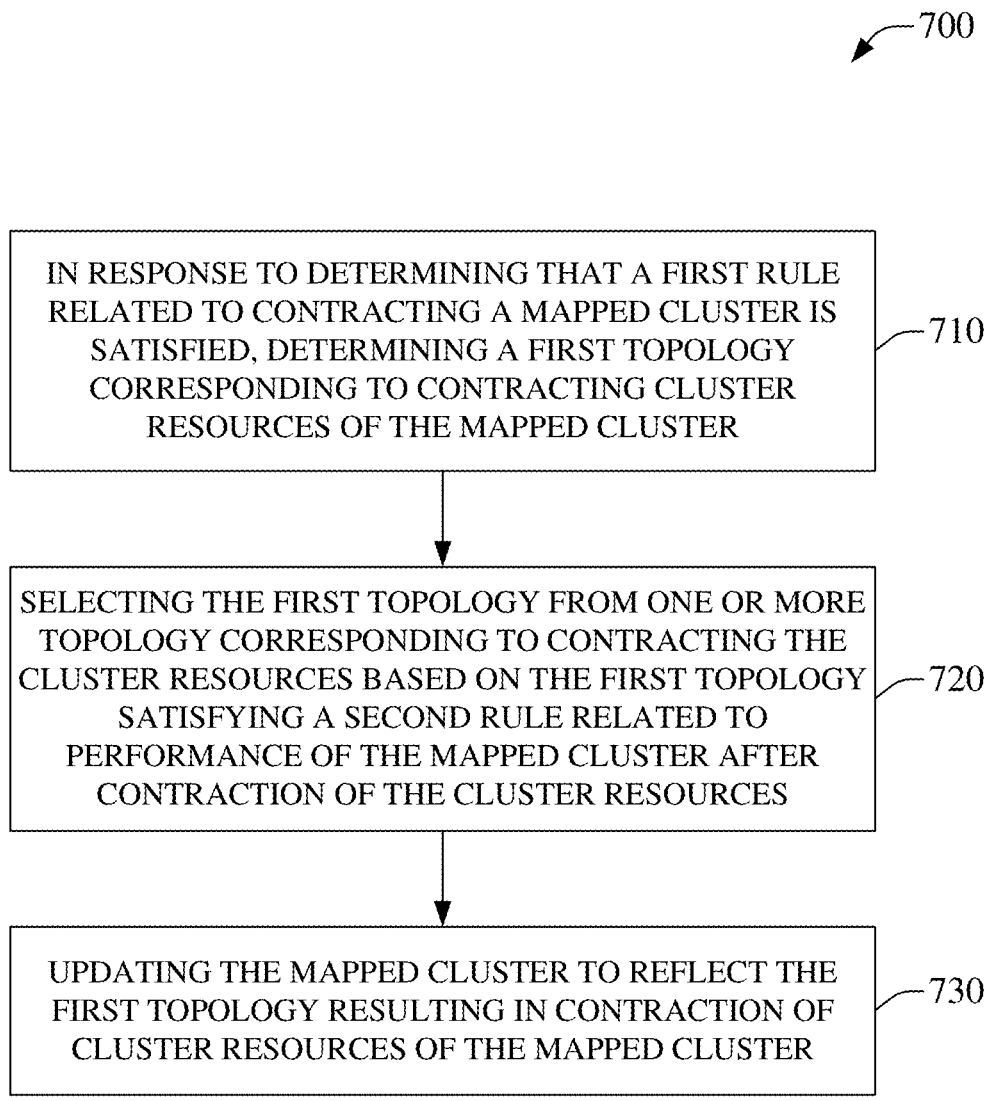
FIG. 7 is an illustration of an example method facilitating storage of data in a mapped cluster according to a contracted topology determined to satisfy a real node failure data protection rule, in accordance with aspects of the subject disclosure.
Figure 8:
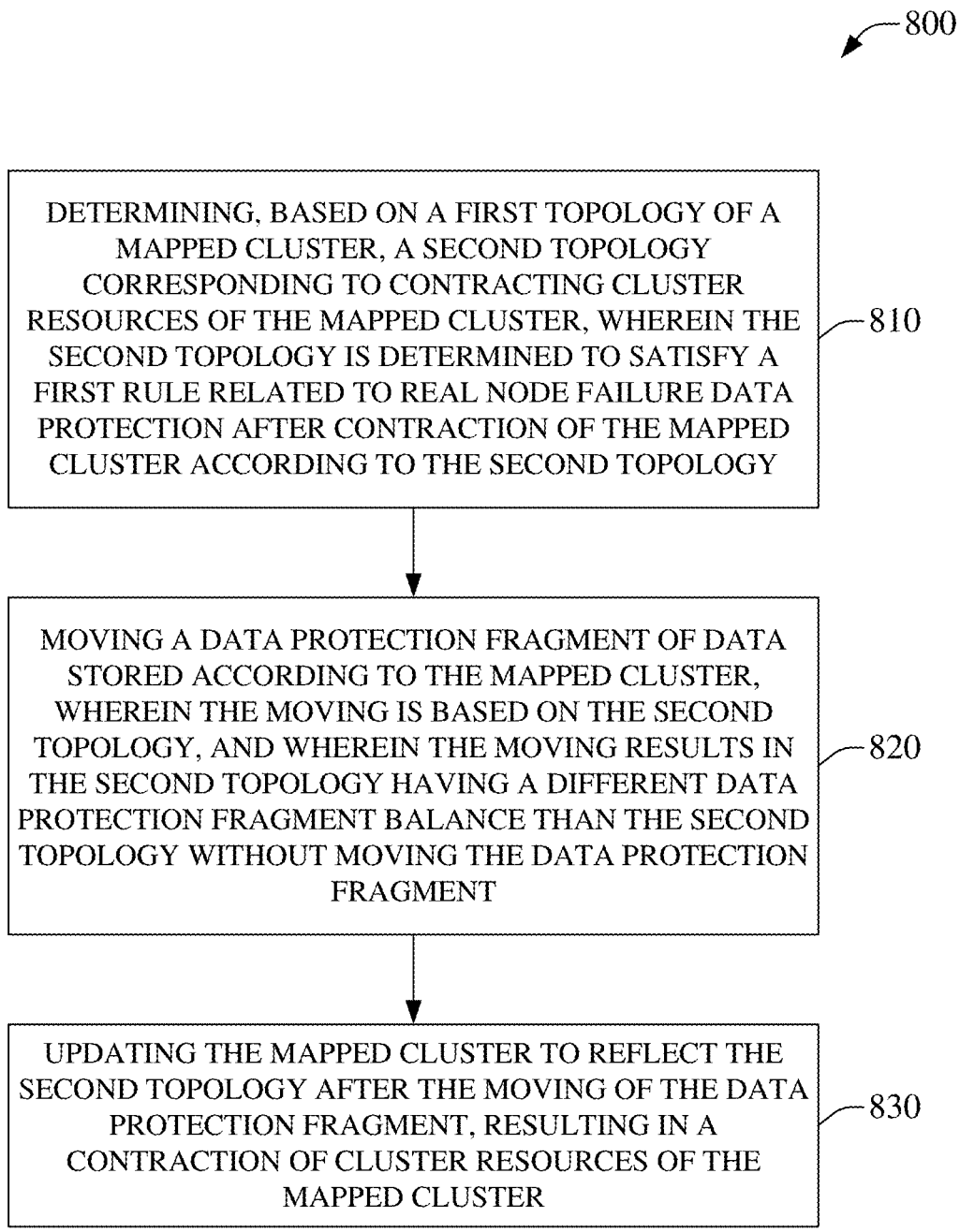
FIG. 8 illustrates an example method that enables storage of data in a mapped cluster according to a contracted topology determined to satisfy a real node failure data protection rule and determined to satisfy a data protection fragment rule, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate storage of data in a mapped cluster according to a contracted topology determined to satisfy a real node failure data protection rule, in accordance with aspects of the subject disclosure. At 710, method 700 can comprise determining a first topology corresponding to contracting mapped cluster resources of a mapped cluster. The first topology can be determined in response to determining that a first rule related to contracting the mapped cluster has been satisfied. In an aspect, the contraction of a mapped cluster, e.g., contracting the resource of a mapped cluster by redefining the topology of the mapped cluster, can be in response to determining that the mapped cluster should be contracted. A mapped cluster can therefore be contracted in response to changing demand on the mapped cluster. As an example, where a mapped cluster has a decreasing demand over time, the change in demand can be used to determine that the mapped cluster should be contracted, e.g., the change in demand can satisfy the first rule. This example can enable mapped clusters to be optimized in response to changing demand on the mapped cluster. In another aspect, the first rule can be determined to be satisfied by user initiated change in services, such as a customer changing a contract for storage services, a storage service provider changing offered storage services, etc. As an example, a customer can opt to select a storage service tier that is less responsive but also saves money, which information can be employed to determine that the first rule is satisfied allowing fewer resources to be expended for a mapped cluster provided to the client, e.g., fewer nodes, without loss of data, e.g., by keeping the full set of disks. In a further aspect, the rule can be satisfied by predicting changes in demand, for example, a larger demand can be seasonal and the first rule can be determined to be satisfied by an expected change in demand, allowing the first topology to be determined in advance of actually implementing the contraction on a determined further date, in response to a threshold demand level being met, etc.

At 720, method 700 can comprise selecting the first topology topologies corresponding to contracting the mapped cluster resources. The selection can be based on the first topology satisfying a second rule related to performance of the mapped cluster after contraction. The second rule can be related to prohibiting disks from a single real node correlating to disks of more than one mapped node of a single mapped cluster. It will be noted that disks form a single real node can be correlated to mapped nodes of different mapped clusters without violating this rule.

Method 700, at 730, can comprise updating the mapped cluster to reflect the first topology. At this point method 700 can end. This can result in contraction of cluster resources of the mapped cluster. In an embodiment, the updating can alter the mapping of the mapped cluster itself, e.g., adapting the mapped cluster topology in situ. In another embodiment, a contracted mapped cluster can be generated according to the first topology and then the old mapped cluster can subsequently be retired.

FIG. 8 is an illustration of an example method 800, which can enable storage of data in a mapped cluster according to a contracted topology determined to satisfy a real node failure data protection rule and determined to satisfy a data protection fragment rule, in accordance with aspects of the subject disclosure. At 810, method 800 can comprise determining, based on a first topology of a mapped cluster, a second topology corresponding to contracting cluster resources of the mapped cluster. The second topology can be determined to satisfy a first rule related to real node failure data protection that can occur after contraction of the mapped cluster according to the second topology. In an aspect, the first rule can determine if the second topology provides satisfactory data protection should a real node fail after the second topology is implemented. Where the second topology is determined not to provide adequate data protection, the second topology can be determined to be unsatisfactory. In an aspect, this can facilitate prohibiting data representations in more than one mapped node of a single mapped cluster from being correlated to data of a single real node, which can enable the mapped cluster to perform data protection schemes between different mapped nodes without danger of the failure of a real node causing a real data loss event by impairing multiple mapped nodes of the mapped cluster.

At 820, the method can comprise moving a data protection fragment of data stored according to the mapped cluster. The moving can be based on the second topology such that if the second topology is implemented, the data protection fragment can be distributed in a manner that provides data protection according to a data protection scheme such as erasure encoding. The moving can also result in the second topology having a different data protection fragment balance than the second topology before the moving. In an aspect, moving the data protection fragment before implementing the second topology can result in better balance of data protection fragments after implementing the second topology, for example as illustrated in system 600.

Method 800, at 830, can comprise updating the mapped cluster to reflect the second topology subsequent to the moving of the data protection fragment at 820. At this point method 800 can end. The updating can result in a contraction of cluster resources for the mapped cluster. In an embodiment, the updating can alter the mapping of the mapped cluster itself, e.g., adapting the mapped cluster topology in situ. In another embodiment, a contracted mapped cluster can be generated according to the second topology and then the mapped cluster having the first topology can subsequently be deleted.

Figure 9:
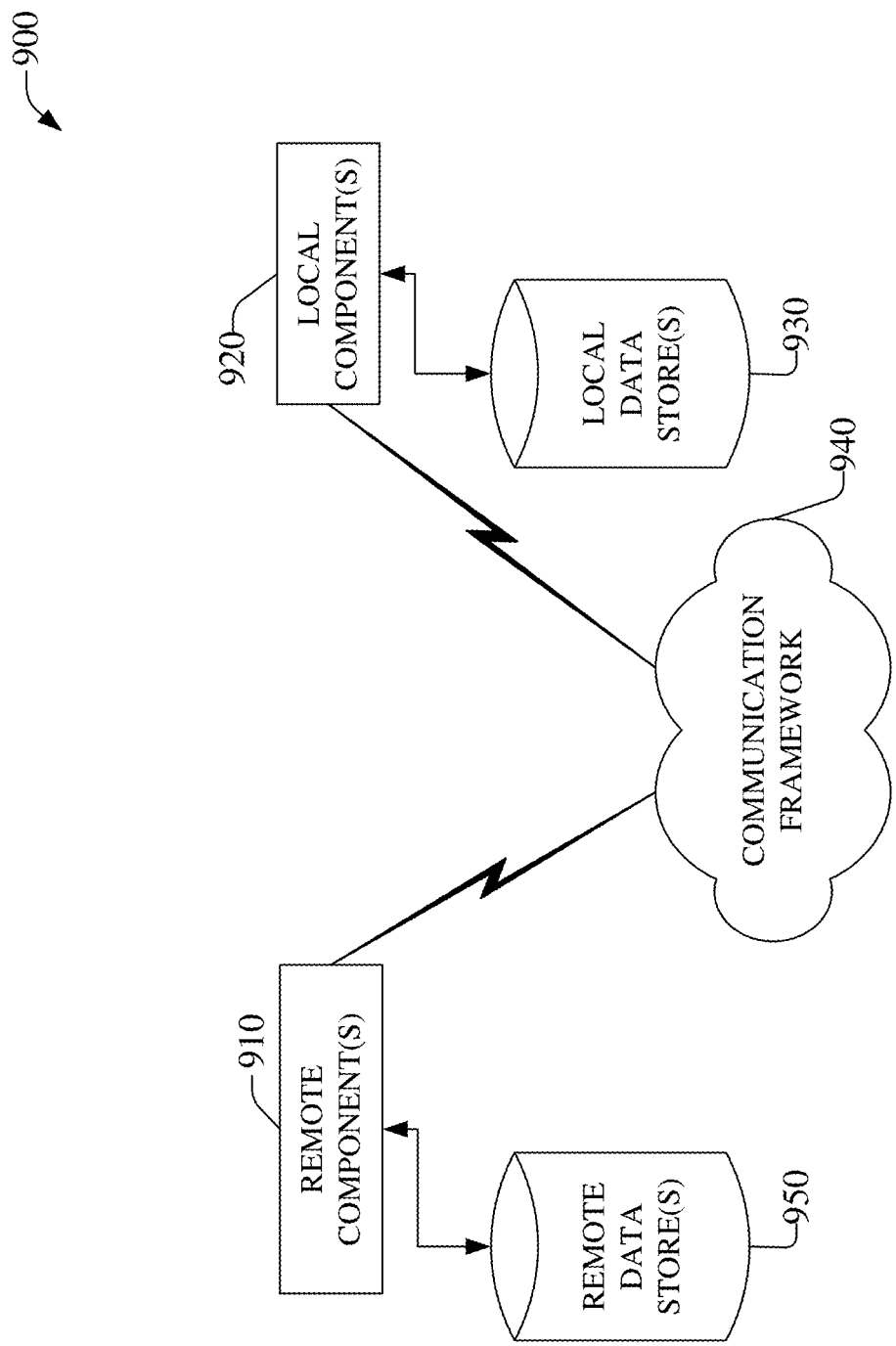
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be components of one or more physical storage component(s) 110, 210, 310, etc., contracting component 130, 230, 330, 430, 530, 630, etc., mapped cluster control component 204, 304, 404, 504, 604, etc., rule component 350, 450, 550, 650, etc., for example, connected to an MSC 120-620, etc., or CMSC 140-640, etc., via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise MSC 120-620, etc., or CMSC 140-640, etc., connected via communication framework 940 to remote components.

One possible communication between a remote component(s) 910 and a local component(s) 920 can be in the form of a data packet adapted to be transmitted between two or more computer processes. Another possible communication between a remote component(s) 910 and a local component (s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, information corresponding to a topology, a change in a topology, a data operation, a relation between a data representation and a correlated data, etc., can be communicated via communication framework 940 between local and remote components, e.g., to facilitate contraction of an mapped cluster, operations on data and data representations, movement of data protection fragments, etc., as disclosed herein.

Figure 10:
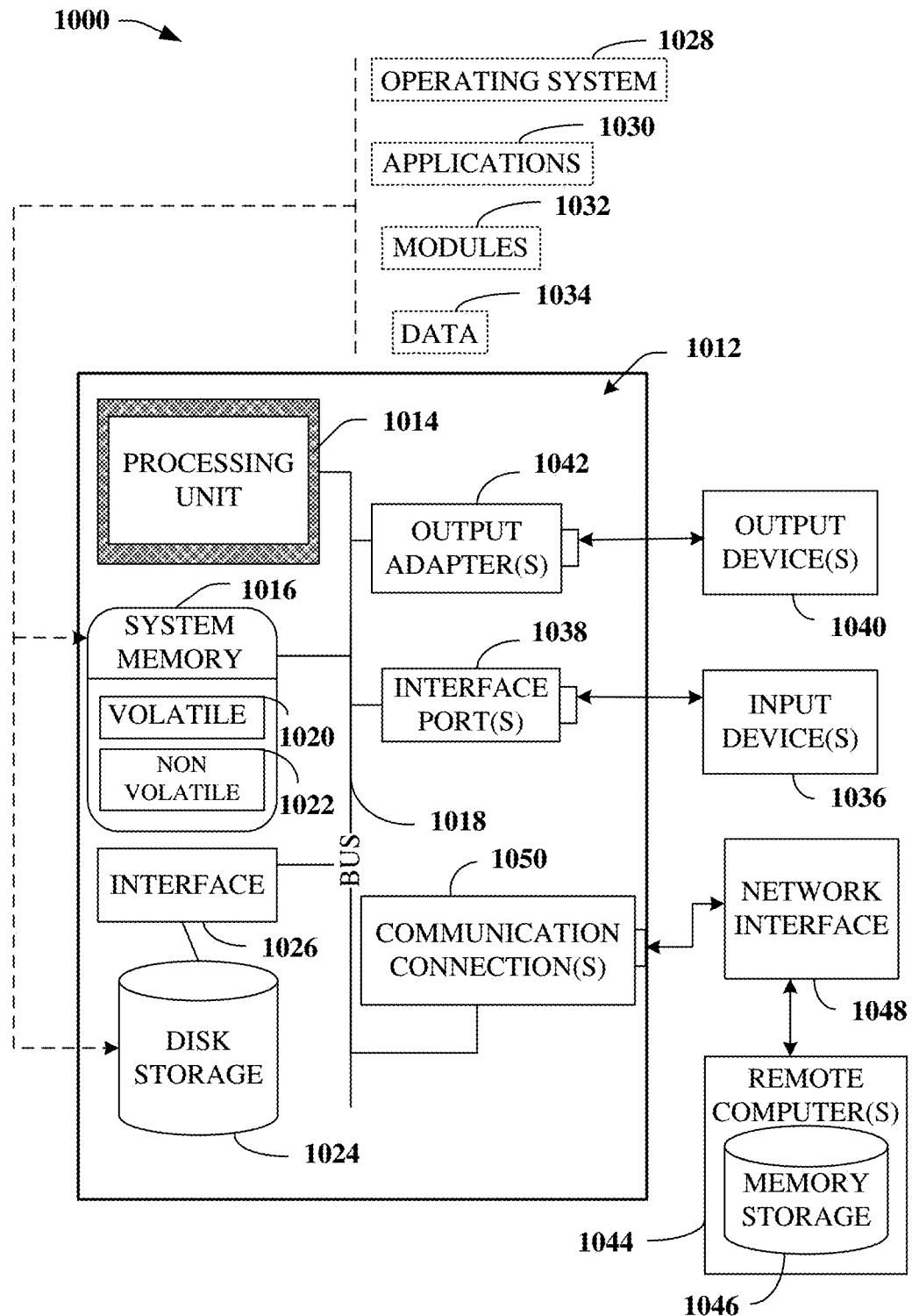
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in one or more physical storage component(s) 110, 210, 310, etc., contracting component 130, 230, 330, 430, 530, 630, etc., mapped cluster control component 204, 304, 404, 504, 604, etc., rule component 350, 450, 550, 650, etc., MSC 120-620, etc., CMSC 140-640, etc., or other components, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor, e.g., CC 130-630, etc., to perform operations, comprising determining a contracted topology, e.g., CMSC 140-640, etc., for a mapped storage system, wherein the contracted topology is determined to satisfy a first rule related to data protection against a failure of a real node of a storage system, e.g., PSC 110-310, etc., corresponding to the mapped storage system, and wherein the contracted topology comprises fewer mapped nodes than an initial topology, e.g., MSC 120-620, etc., and initiating contraction of the mapped storage system based from the initial topology to the contracted topology, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      receiving an indication to contract computing resources of a mapped storage system, wherein physical storage locations comprised in one or more real nodes of a physical storage system correspond to logical storage locations comprised in one or more mapped nodes of the mapped storage system, and wherein the correspondence between the physical storage locations and the logical storage locations is according to a topology of the mapped storage system;

determining, based on a first topology of the mapped storage system comprising a first count of mapped nodes, a second topology for the mapped storage system, wherein the second topology is determined to satisfy a first rule related to data protection against a failure of a real node of the physical storage system corresponding to the mapped storage system affecting two or more mapped nodes of a mapped cluster of the mapped storage system, wherein the second topology comprises a second count of mapped nodes that is fewer mapped nodes than the first count of mapped nodes of the first topology, and wherein the second count of mapped nodes of the second topology stores the same amount of data as the first count of mapped nodes of the first topology; and initiating contraction of the mapped storage system from the first topology to the second topology.

2. The system of claim 1, wherein the processor is a real processor.

3. The system of claim 1, wherein the processor is a virtual processor executing on a real processor.

4. The system of claim 1, wherein the system is comprised in the storage system.

5. The system of claim 1, wherein the system is comprised in the mapped storage system.

6. The system of claim 1, wherein the system is comprised in a device that is not comprised in the storage system and is not comprised in the mapped storage system.

7. The system of claim 1, wherein the operations further comprise, selecting the second topology from topologies comprising the second topology based on a rank of the second topology among the topologies.

8. The system of claim 7, wherein the rank is based on an amount of computing resources projected to be used in an implementation of the second topology for the mapped storage system.

9. The system of claim 7, wherein the rank is based on a level of performance projected to be experienced for an implementation of the second topology for the mapped storage system.

10. The system of claim 1, wherein the operations further comprise, determining that the second topology satisfies a second rule related to data protection, and wherein the second rule relates to distribution of data protection fragments for the second topology.

11. The system of claim 10, wherein the determining that the second topology satisfies the second rule comprises determining an alteration of a distribution of data protection fragments of the first topology prior to the initiating of the contraction of the mapped storage system to facilitate contracting the mapped storage system from the first topology to the second topology in accord with the second rule.

12. The system of claim 10, wherein the determining that the second topology satisfies the second rule comprises determining a transfer of mapped nodes of the first topology prior to the initiating of the contraction of the mapped storage system, wherein the mapped nodes of the first topology comprise data protection fragments, and wherein the transfer of the mapped nodes of the first topology facilitates contracting the mapped storage system from the first topology to the second topology in accord with the second rule.

13. A method, comprising:

determining, by a system comprising a processor and a memory, a contraction schema for contracting a mapped storage system from a first topology to a second topology, wherein the first topology comprises a first number of mapped nodes, wherein the second topology comprises a second number of mapped nodes that are fewer mapped nodes than the first number of mapped nodes of the first topology, wherein physical storage areas comprised in one or more real nodes of a real storage system correspond to logical storage areas comprised in one or more mapped nodes of the mapped storage system, wherein the correspondence between the physical storage areas and the logical storage areas is according to a topology of the mapped storage system, and wherein the second topology accommodates storing the data of the first topology via the second number of mapped nodes that is fewer than the first number of mapped nodes; and in response to determining, by the system, that the second topology does not result in real disks of a real node of a real cluster being represented by more than one mapped node of a mapped cluster of the mapped storage system, initiating contraction of the mapped storage system from the first topology to the second topology based on the contraction schema.

14. The method of claim 13, further comprising determining, by the system, that the second topology satisfies a rule related to distribution of data protection fragments according to the second topology.

15. The method of claim 14, wherein the determining that the second topology satisfies the rule comprises determining that the contraction schema comprises the contracting of the mapped nodes of the mapped storage system from the first topology to the second topology in a manner that prevents a count of the data protection fragments comprised in a mapped node of the mapped nodes from traversing a threshold value in the second topology.

16. The method of claim 14, wherein the determining that the second topology satisfies the rule comprises determining that the contraction schema comprises altering a distribution of the data protection fragments of the first topology of the mapped storage system prior to the contracting of the mapped storage system from the first topology to the second topology.

17. A non-transitory machine-readable medium, comprising executable instructions that, when executed by a processor, facilitate performance of operations, comprising:

in response to receiving an instruction to contract a mapped storage system, determining, based on a first topology of the mapped storage system, a second topology for the mapped storage system, wherein the second topology enables storage of the data of the first topology via fewer mapped nodes than the first topology, wherein physical storage sites comprised in one or more real nodes of a real storage system correspond to logical storage sites comprised in one or more mapped nodes of the mapped storage system, and wherein the correspondence between the physical storage sites and the logical storage sites is according to a topology of the mapped storage system; and causing contraction of the mapped storage system from the first topology to the second topology.

18. The non-transitory machine-readable storage medium of claim 17, wherein the second topology does not comprise a relationship between data of more than one mapped node of the mapped storage system with a single node of a corresponding storage system.

19. The non-transitory machine-readable storage medium of claim 17, wherein the second topology is not to comprise more than a threshold count of data protection fragments in a mapped node of the mapped storage system after the contraction of the mapped storage system from the first topology to the second topology as a result of shifting the mapped node based on an initial count of data protection fragments comprised in the mapped node prior to the contraction of the mapped storage system.

20. The non-transitory machine-readable medium of claim 17, wherein the second topology is not to comprise more than a threshold count of data protection fragments in a mapped node of the mapped storage system after the contraction of the mapped storage system from the first topology to the second topology as a result of shifting data protection fragments of the mapped node to another mapped node prior to the contraction of the mapped storage system.

* * * * *